(12) United States Patent
Marshall (10) Patent No.: US 11,134,619 B2
(45) Date of Patent: Oct. 5, 2021

(54) VENTILATED PLANT PROPAGATION ASSEMBLY

(71) Applicant: Aaron Marshall, Studio City, CA (US)

(72) Inventor: Aaron Marshall, Studio City, CA (US)

( * ) Notice: Subject to any disclaimer, the term of this patent is extended or adjusted under 35 U.S.C. 154(b) by 154 days.

(21) Appl. No.: 16/501,491

(22) Filed: Jan. 30, 2020

(65) Prior Publication Data

US 2021/0235633 A1 Aug. 5, 2021

(51) Int. Cl.
*A01G 9/24* (2006.01)
*A01G 9/16* (2006.01)
*A01G 9/029* (2018.01)

(52) U.S. Cl.
CPC ........... *A01G 9/241* (2013.01); *A01G 9/0297* (2018.02)

(58) Field of Classification Search
CPC . A01G 9/18; A01G 9/24; A01G 9/241; A01G 9/00; A01G 9/02; A01G 13/0212; A01G 13/04; A01G 31/02; A01G 9/16; A01G 31/06; A01G 31/00; B65D 43/12; B65D 43/20

See application file for complete search history.

(56) References Cited

U.S. PATENT DOCUMENTS

| | | | | |
|---|---|---|---|---|
| 3,606,697 A * | 9/1971 | Eden | ........................ | A01G 9/16 47/69 |
| 4,236,350 A * | 12/1980 | Hasselbach, Sr. | ....... | A01G 9/16 47/17 |
| 4,249,341 A * | 2/1981 | Huegli | .................. | B65D 81/262 47/14 |
| 4,291,494 A * | 9/1981 | Knablein | .................. | A01G 9/16 47/17 |
| 4,586,288 A * | 5/1986 | Walton | .................. | A01G 9/0295 47/73 |
| 6,364,096 B1 * | 4/2002 | De Baets | ........... | B65D 21/0219 206/1.5 |
| 8,291,639 B2 * | 10/2012 | Gardner | .................. | A01G 31/02 47/60 |
| 9,637,281 B2 * | 5/2017 | Koo | ........................ | B65D 43/12 |
| 9,924,834 B2 * | 3/2018 | Joffe | ........................ | B65D 50/06 |
| 10,531,618 B2 * | 1/2020 | Marshall | .................. | A01G 9/16 |
| 2017/0196404 A1 * | 7/2017 | Joffe | ........................ | B65D 50/06 |
| 2018/0325055 A1 * | 11/2018 | Krakover | ............... | A01G 31/06 |

* cited by examiner

*Primary Examiner* — Kristen C Hayes
(74) *Attorney, Agent, or Firm* — Elizabeth Yang (57) ABSTRACT

A ventilated plant propagation assembly provides a propagation tray that supports plant life, and a dome that covers the plants. The assembly allows for selective control between a ventilated position that allows aeration inside the dome, and a sealed position that restricts aeration inside dome. The dome laterally slides, so that depressions at the dome edges selectively interlock with ribs at the tray edges. Thus, when the dome edge slides offset from the tray edge, the dome depression engages the tray ribs, creating a seal at the junction of tray and dome. Conversely, slidably aligning the dome with the tray urges the tray ribs against the dome flange. This pushes the dome up to create a gap between the tray flange and the flat surface of the dome flange. The gap enables aeration inside dome by creating a passageway for air to flow through the edges between dome and tray.

20 Claims, 8 Drawing Sheets

VENTILATED PLANT PROPAGATION ASSEMBLY

FIELD OF THE INVENTION

The present invention relates generally to a ventilated plant propagation assembly. More so, the present invention relates to a plant propagation assembly that supports plant life in a propagation tray covered by a dome, and allows for easy, selective control between a ventilated position, and a sealed position by laterally sliding the dome so that depressions at the dome edges selectively interlock with ribs at the tray edges; whereby when the dome edge slides offset from the tray edge, the dome depression engages a peak at the tray ribs, creating a seal at the junction of the tray and the dome; and whereby slidably aligning the dome with the tray urges the tray ribs against the dome flange to create a small gap for aeration inside the domed propagation tray.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, propagation trays are utilized to grow new plant life from either seed or a cutting from an existing plant. Propagation trays have aeration problems, which can cause condensation inside of the clear top/dome part of the system which allows light to the plants. Most propagation trays have ventilation means at the top wall of the dome, which restricts passage of air, but not enough to clear away the condensation in a timely manner if at all. It is often necessary to remove the dome for cleaning and wiping condensate to rid the propagation trays of condensation or issues such as mold. The standard typical ventilation does not provide adequate air flow throughout, the plant life cycle, after the plant roots it is necessary to introduce more air to the plants/root system.

Other proposals have involved propagation trays and ventilation thereof. The problem with these propagation trays is that they do not provide a quick and easy means to ventilate the plants therein. Also, the aeration is not complete with simple vents at the top of the dome. Even though the above cited propagation trays meets some of the needs of the market, a ventilated plant propagation assembly that supports plant life in a propagation tray covered by a dome, and allows for easy, selective control between a ventilated position, and a sealed position by laterally sliding the dome so that depressions at the dome edges selectively interlock with ribs at the tray, edges; whereby when the dome edge slides offset from the tray edge, the dome depression engages a peak at, the tray ribs, creating a seal at the junction of the tray and the dome; and whereby slidably aligning the dome with the tray urges the tray ribs against the dome flange to create a small gap for aeration inside the domed propagation tray, is still desired.

SUMMARY

Illustrative embodiments of the disclosure are generally directed to a ventilated plant propagation assembly. The ventilated plant propagation assembly provides a propagation tray, that supports plant life, and a dome that covers the plants and the propagation tray. The ventilated plant propagation assembly allows for easy, selective control between a ventilated position that allows aeration inside the dome, and a sealed position that restricts aeration inside the dome. The dome is manually displaced into both positions by laterally sliding the dome so that depressions at the dome edges selectively interlock with ribs at the tray edges.

Thus, when the dome edge slides offset from the tray edge, the dome depression engages a peak at the tray ribs, creating a seal at the junction of the tray and the dome. Conversely, slidably aligning the dome with the tray urges the tray ribs against the dome flange. This pushes the dome up about 0.2" to create a gap between the tray flange and the dome flange. The gap enables aeration inside the dome by creating a narrow passageway for air to flow through the edges between the dome and tray, which were previously sealed.

In one aspect, the ventilated plant propagation assembly, comprises:

a propagation tray adapted to propagate a plant, the propagation tray being defined by a plant floor having multiple plant cavities adapted to receive the plant, the propagation tray further being defined by multiple sidewalk extending from the plant floor and extending to a free edge, the edge forming a tray flange, the tray flange having multiple tray ribs;

a dome adapted to mate with the propagation tray, the dome further being adapted to slide laterally in relation to the propagation tray when mated with the propagation tray, the dome being defined by an upper wall, multiple sidewalk having an upper edge joined with the upper wall, and a lower edge opposing the upper edge, the lower edge terminating at a dome flange having a flat surface, the dome flange extending beyond the tray flange when the dome mates with the tray, the dome flange having multiple depressions;

whereby slidably offsetting the dome from the tray urges the tray ribs into the depression of the dome flange, creating a seal between the tray flange and the dome flange; and whereby slidably aligning the dome with the tray urges the tray ribs against the flat surface of the dome flange, creating a gap between the tray flange and the dome flange.

In another aspect, the propagation tray is adapted to propagate a plant or a seed.

In another aspect, the propagation tray has a rectangular shape or a square shape.

In another aspect, the propagation tray is fabricated from a polymer.

In another aspect, the dome is fabricated from heavy duty clear plastic.

In another aspect, the offset dome pivots about the tray at the lower edge.

In another aspect, the multiple tray ribs comprise three tray ribs.

In another aspect, the dome flange extends about one inch beyond the tray flange when the dome mates with the tray.

In another aspect, the gap between the tray flange and the dome flange enables passage of air into the propagation tray.

In another aspect, the upper wall of the dome comprises at least one vent.

In another aspect, the vent is rotatable between an open position and a closed position.

In another aspect, the depressions of the dome flange have substantially the same shape as the tray ribs.

In another aspect, the assembly further comprises a base portion, the base portion being sized and dimensioned to support the propagation tray.

In another aspect, the base portion comprises a base floor and multiple base sidewalk extending from the base floor.

One objective of the present invention is to regulate aeration inside a domed plant propagation tray by sliding the dome between an offset and an aligned position relative to the propagation tray.

Another objective is to prevent mold from growing in a plant propagation tray.

Yet another objective is to minimize condensation inside the domed plant propagation tray.

Yet another objective is to minimize labor associated with propagating plants inside a domed plant propagation tray.

Yet another objective is to produce an inexpensive to manufacture domed plant propagation tray.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A ventilated plant propagation assembly is referenced in FIGS. 1-11. The ventilated plant propagation assembly 100, hereafter "assembly 100" provides a unique domed plant propagation tray 102 that enables easy, selective manipulation to move between a ventilated position 302 for aerating inside the domed propagation tray 102, and a sealed position 206 for normal growing conditions. The unique capacity of the assembly 100 to start new plant life from either seed or a cutting from an existing plant is enhanced by facilitating aeration, which minimizes mold and condensation inside the domed propagation tray 102. The assembly 100 provides a novel interlocking relationship between ribs on a lower propagation tray 102, and depressions that form on an overlaying dome. The dome is slidably displaced across the edges of the tray, such that, the ribs ride the flat surface of the dome edge to maintain the aeration gap, and then fall into the depressions to create the seal therebetween.

Figure 1:
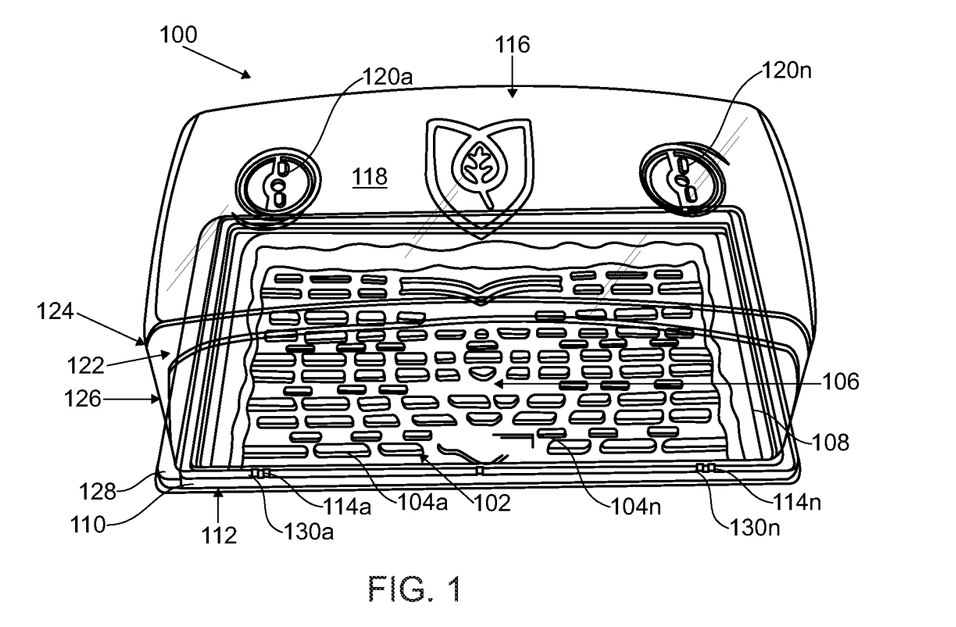
FIG. 1 illustrates a top angle perspective view of an exemplary ventilated plant propagation assembly, in accordance with an embodiment of the present invention.

As referenced in FIG. 1, the assembly 100 comprises a propagation tray 102 adapted to propagate a plant. The propagation tray 102 may include a flat, rectangular plate that forms multiple plant cavities 104a-n sized to receive a plant, seed, or other multi-cellular organism for propagation and growth thereof. However, in alternative embodiments, the propagation tray 102 may have a circular, triangular, or irregular shape. Suitable materials for the propagation tray 102 may include, without limitation, a polymer, a resilient plastic, and an organic material efficacious for growing plants.

In some embodiments, the propagation tray 102 is defined by a plant floor 106 that provides support for the plant. The plant floor 106 may form multiple plant cavities 104a-n adapted to receive the plant, creating a protective growing environment for the plant or seed. In some embodiments, the plant cavities 104a-n may be tapered, or may be uniform in cross-sectional size. The propagation tray 102 is also defined by multiple sidewalls 108 extending from the plant floor 106, In one non-limiting embodiment, the sidewalls 108 extend up less than 1". However, since the assembly 100 is scalable, the sidewalk 108 of the propagation tray 102 may be longer or shorter, as dictated by the type of plant being grown.

The sidewalls 108 of the propagation tray 102 extend up to a free edge 110 that circumambulates the entirety of the plant floor 106. The free edge 110 forms a tray flange 112. In one embodiment, the tray flange 112 extends at an orthogonal from the free edge 110. The tray flange 112 has multiple tray ribs 114a-n, defined by a peak and a valley. In one non-limiting embodiment, the ribs include at least three ribs. In another embodiment, the tray ribs 114a-n have a height of about 0.2", As described below, the tray ribs interlock with corresponding depressions that form along a dome flange to enable selective manipulation between a sealed position 206 that restricts entry of air into the domed area (FIG. 2), and a ventilated position 302 that forms a gap 300 for passage of air into the domed area (FIG. 3).

In some embodiments, the assembly 100 may also include a base portion 200 disposed beneath the propagation tray 102 for support and manipulation thereof. The base portion 200 is sized and dimensioned to have a generally concave shape and rigid edges that can support the weight of the propagation tray 102 and plants therein. In one non-limiting embodiment, the base portion 200 comprises a base floor 202 and multiple base sidewalls 204 extending from the base floor 202. The base sidewalls 204 rest beneath the free edges 110 of the propagation tray 102. Suitable materials for the base portion 200 may include, without limitation, a polymer, a resilient plastic, rubber, and silicone.

Looking again at FIG. 1, the assembly 100 provides a dome 116 that corresponds to the propagation tray 102, forming a seal and enabling passage of light for photosynthesis and other growth-related functions. In some embodiments, the dome 116 is fabricated from heavy duty clear plastic. The dome 116 is adapted to mate with the propagation tray 102 at the edges. The connection may be a friction-fit connection, or may involve fasteners. The dome 116 is also adapted to slide laterally in relation to the propagation tray 102 when mated with the propagation tray 102.

Figure 2:
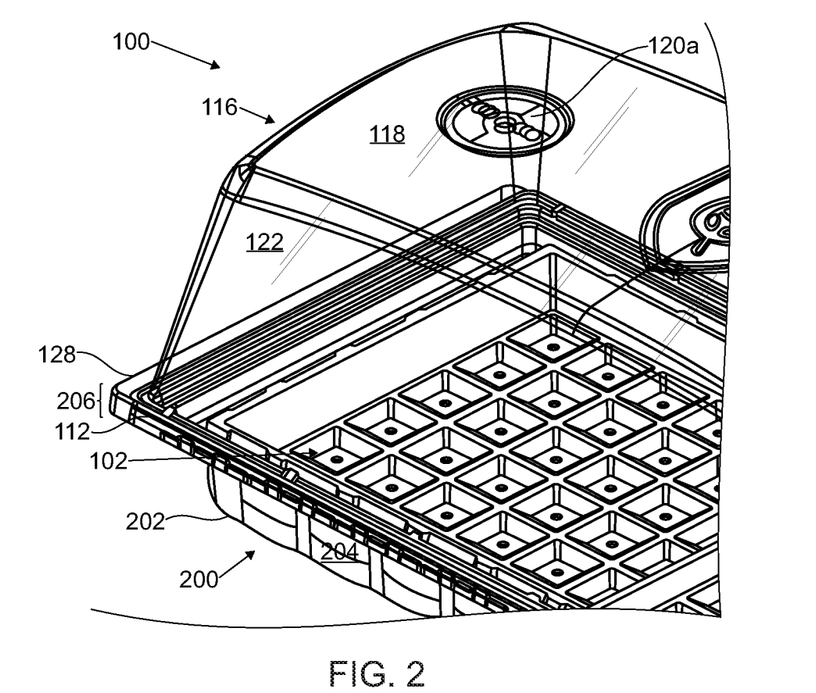
FIG. 2 illustrates a perspective view of the ventilated plant propagation assembly shown in FIG. 1, showing a sealed position, in accordance with an embodiment of the present invention.
Figure 3:
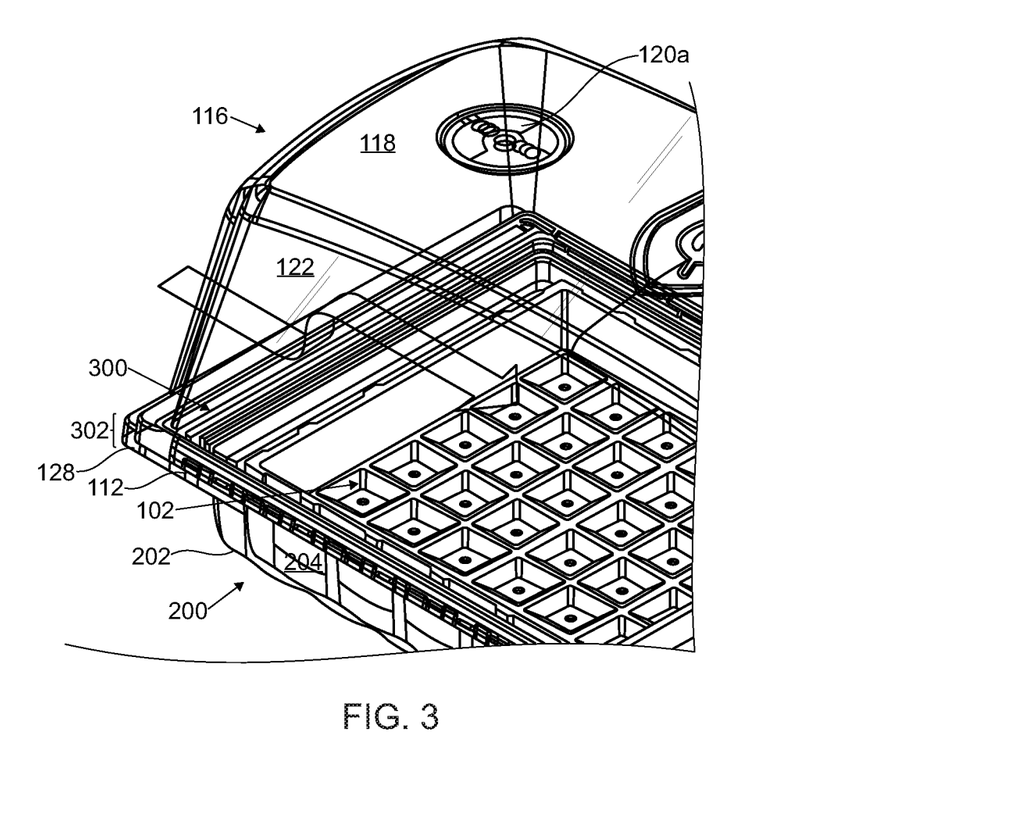
FIG. 3 illustrates a perspective view of the ventilated plant propagation assembly shown in FIG. 1, showing a ventilated position allowing air to flow into the domed propagation tray, in accordance with an embodiment of the present invention.

Looking now at FIG. 2, the dome 116 is defined by an upper wall 118 and multiple sidewalls joined thereto. The upper wall 118 may include at least one vent 120a-n is rotatable between an open position and a closed position. However, in other embodiments, no vents are included in the dome 116. The sidewalls 122 of the dome 116 are defined by an upper edge 124 joined with the upper wall 118, and a lower edge 126 opposing the upper edge 124. The lower edge 126 terminates at a dome flange 128. The dome flange 128 may be at an orthogonal to the dome 116 sidewalls. In some embodiments, shown in FIG. 3, the dome walls 118, 122 fond a rounded shape. Suitable materials for the dome walls 118, 122 may include a heavy-duty plastic or other transparent material known in the art of plant husbandry and greenhouses.

Figure 4:
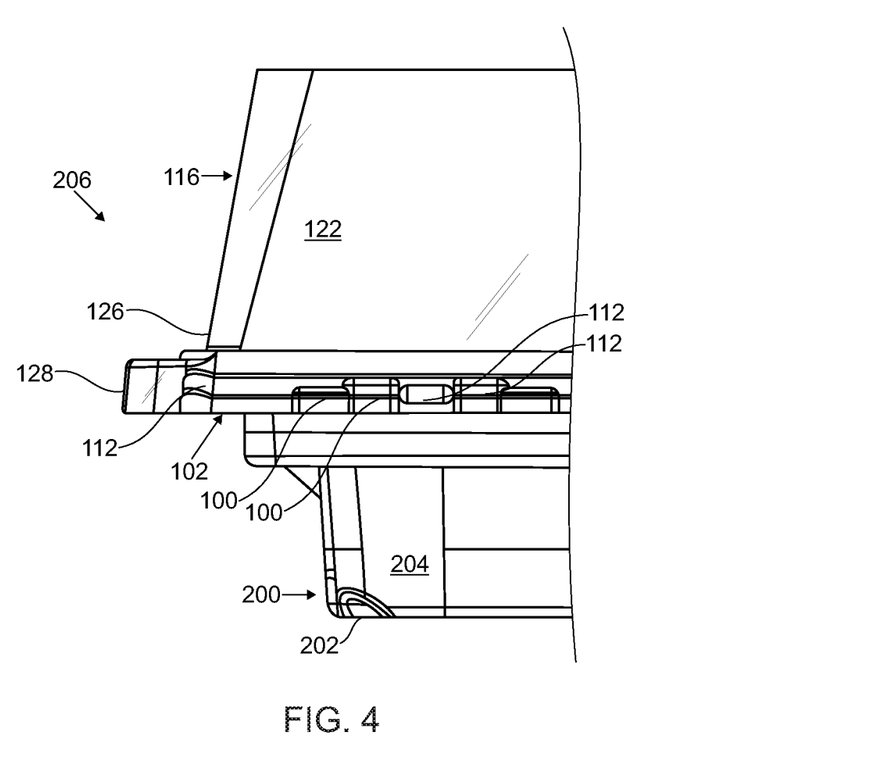
FIG. 4 illustrates an elevated side view of the interconnection between the tray flange and the dome flange, showing a sealed position, in accordance with an embodiment of the present invention.
Figure 5:
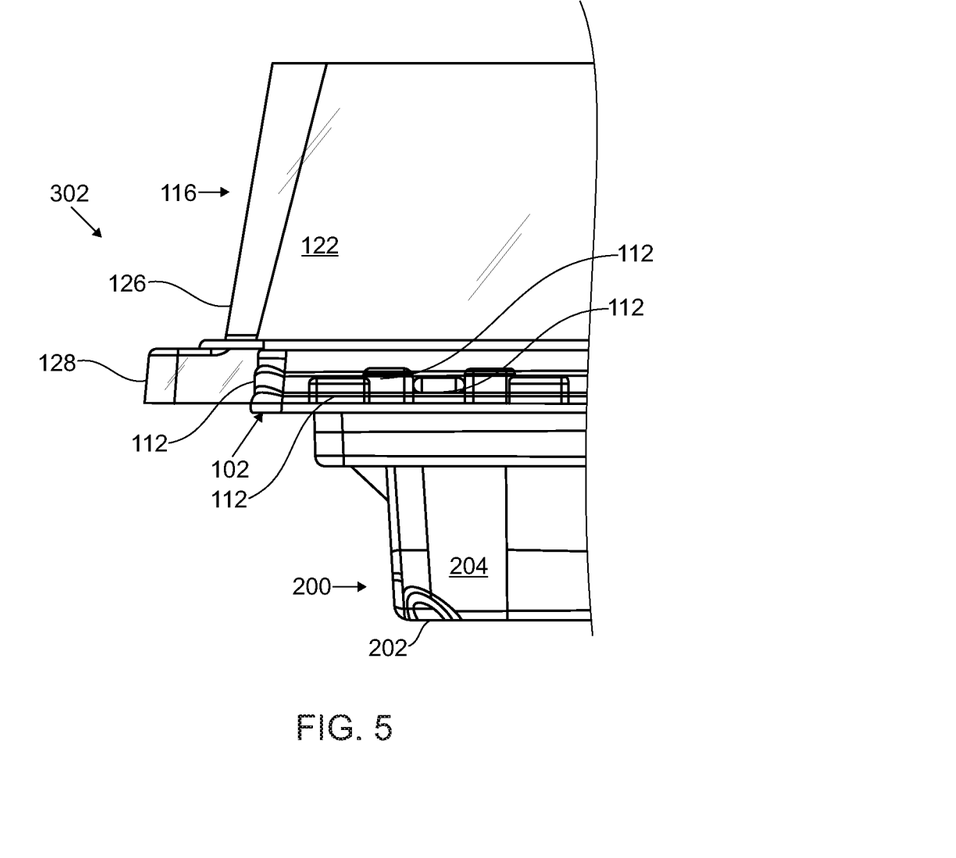
FIG. 5 illustrates an elevated side view of the interconnection between the tray flange and the dome flange, showing a ventilated position, in accordance with an embodiment of the present invention.

As referenced in FIG. 4, the dome flange 128 extends out less than an inch, and has a substantially flat surface. In other embodiments, the dome flange 128 extends beyond the tray flange 112 when the dome 116 mates with the tray. In one embodiment, the dome flange 128 extends about 1" beyond the tray flange 112 when the dome 116 mates with the tray. However, in other embodiments, the dome flange 128 extends 0.5" from opposing ends of the dome flange 128. Further, the dome flange 128 has multiple depressions 130a-n. As FIG. 5 illustrates, the depressions 130a-n of the dome flange 128 have substantially the same shape as the tray ribs 114a-n. This may include a generally pyramidical shape. The similar shapes allow the tray ribs 114a-n to slide in and out of the depressions with minimal force applied.

Figure 6:
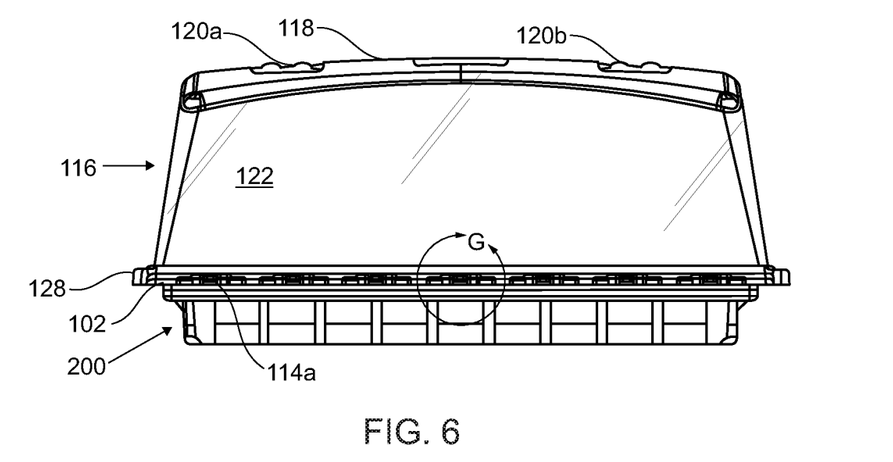
FIG. 6 illustrates an elevated side view of the ventilated plant propagation assembly, showing a sealed position, in accordance with an embodiment of the present invention.
Figure 7:
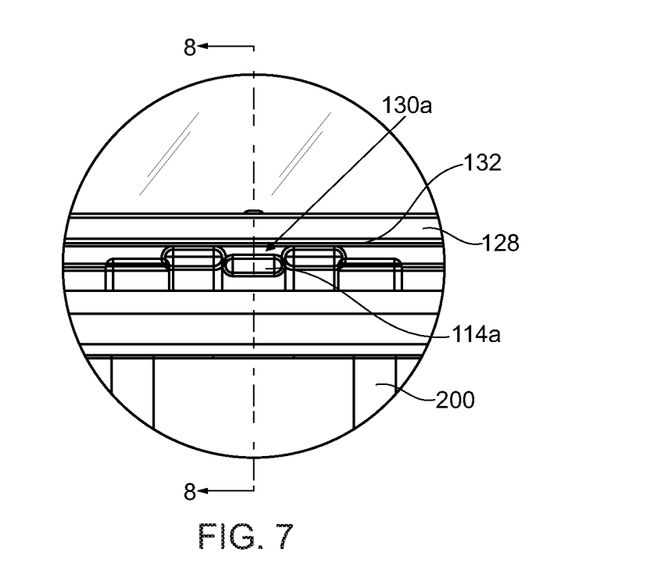
FIG. 7 illustrates a closeup view of the tray ribs interconnecting to the dome depressions in the sealed position, in accordance with an embodiment of the present invention.

Looking now at FIG. 6, the dome 116 can be slidably displaced across the face of the propagation tray 102, such that the dome flange 128 is offset from the tray flange 112. This may include laterally pulling or pushing the dome 116 about 0.5" in either direction relative to the tray. As FIG. 7 shows, sliding the dome 116 to this offset position relative to the tray, urges one of the tray ribs 114a into the depression 130a of the dome flange 128. This works to create a seal between the tray flange 112 and the dome flange 128, i.e., sealed position 206. The seal may be airtight, and conducive to growing the plant under certain conditions.

Figure 8:
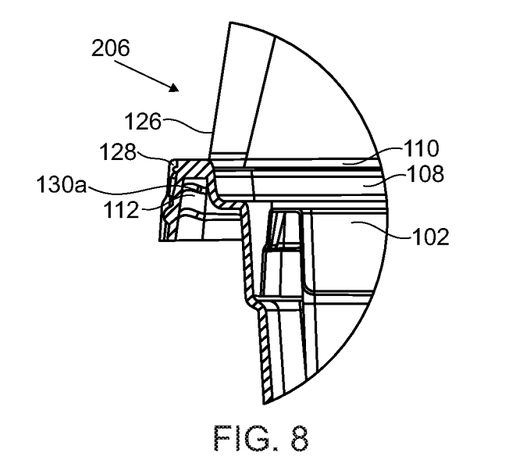
FIG. 8 presents a sectioned side view of the junction between the dome and the propagation tray, showing the interconnected flanges, the section taken along section 8-8 of FIG. 7, detailing a sealed position, in accordance with an embodiment of the present invention.

Thus, as shown in FIG. 8, the tray ribs 114a-n fall into the depression 130a to create a flush interface between the tray flange 112 and the flat surface of the dome flange 128. It is significant to note that from the offset position, dome 116 can pivot about the tray at the lower edge 126. This pivotable opening (or full removal of the dome 116) allows full access to the propagation ray 102 and plants contained therein.

Figure 9:
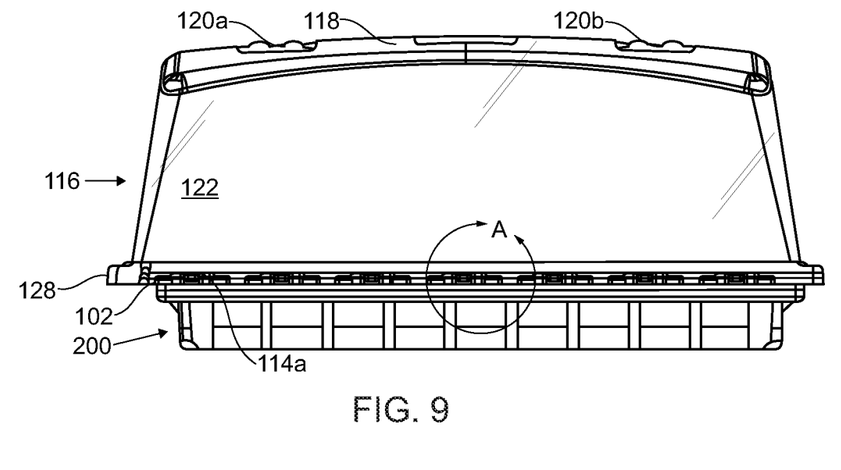
FIG. 9 illustrates an elevated side view of the ventilated plant propagation assembly, showing a ventilated position, in accordance with an embodiment of the present invention.
Figure 10:
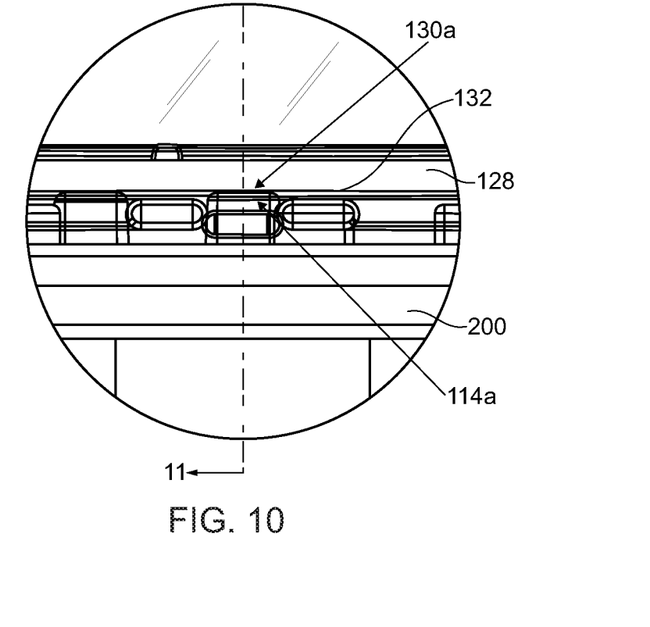
FIG. 10 illustrates a closeup view of the tray ribs interconnecting to the dome depressions in the ventilated position, in accordance with an embodiment of the present invention.

Turning now to FIG. 9, the dome 116 can also be slidably pushed or pulled until the dome flange 128 is in alignment with the tray flange 112. This alignment urges the tray ribs 114a-n against the flat surface 132 of the dome flange 128. This sliding engagement between tray rib 114a and dome flange 128 causes the dome 116 to raise slightly, creating a gap 300 between the tray flange 112 and the dome flange 128, i.e., ventilated position 302. For example, FIG. 10 illustrates a closeup view of the tray ribs interconnecting to the dome depressions in the ventilated position. The gap 300, which extends across the lower edge 126 of the dome 116 and the free edge 110 of the propagation tray 102; creates a horizontal passageway for air to pass across the propagation tray 102.

Figure 11:
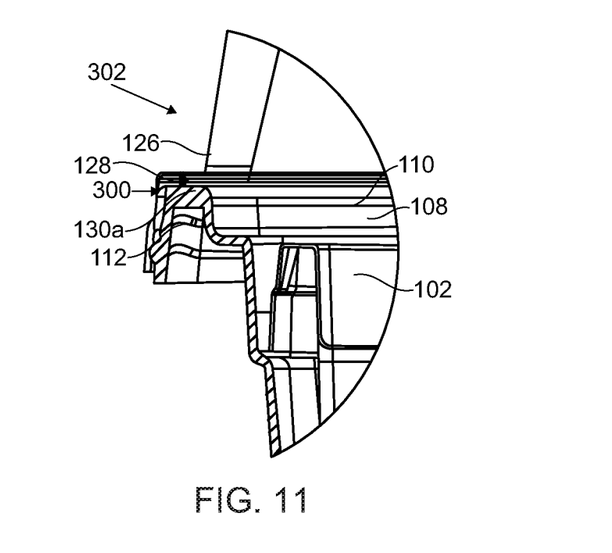
FIG. 11 presents a sectioned side view of the junction between the dome and the propagation tray, showing the interconnected flanges, the section taken along section 11-11 of FIG. 10, detailing a sealed position, in accordance with an embodiment of the present invention.

In one non-limiting embodiment, the gap has a height of about 0.2", which is approximately the height of the tray ribs 114a-n. However, in other embodiments, the tray rib 114a may be constructed larger or smaller than 0.2", so as to affect the size of the gap 300 between the tray and dome flanges. Thus, as FIG. 11 illustrates, the gap 300, along with the vent in the upper wall 118 of the dome 116, work to create air convection to create air flow, condensation, and essentially eliminate labor. For example, FIG. 3 illustrates air entering through the gap 300 at the junction of the dome 116 and the tray 102. In this manner, the dome 116 can be slidably displaced to selectively achieve the sealed position 206 and the ventilated position 302.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalence.

What is claimed is:

1. A ventilated plant propagation assembly, the assembly comprising:

a propagation tray adapted to propagate a plant, the propagation tray being defined by a plant floor having multiple plant cavities adapted to receive the plant, the propagation tray further being defined by multiple sidewalk extending from the plant floor and extending to a free edge, the edge forming a tray flange, the tray flange having multiple tray ribs;

a dome adapted to mate with the propagation tray, the dome further being adapted to slide laterally in relation to the propagation tray when mated with the propagation tray, the dome being defined by an upper wall, multiple sidewalk having an upper edge joined with the upper wall, and a lower edge opposing the upper edge, the lower edge terminating at a dome flange having a flat surface, the dome flange extending beyond the tray flange when the dome mates with the tray, the dome flange having multiple depressions;

whereby slidably offsetting the dome from the tray urges the tray ribs into the depression of the dome flange, creating a seal between the tray flange and the dome flange; and whereby slidably aligning the dome with the tray urges the tray ribs against the flat surface of the dome flange, creating a gap between the tray flange and the dome flange.

2. The assembly of claim 1, wherein the propagation tray is adapted to propagate a plant or a seed.

3. The assembly of claim 1, wherein the propagation tray is defined by a rectangular shape or a square shape.

4. The assembly of claim 1, wherein the propagation tray is fabricated from a polymer.

5. The assembly of claim 1, wherein the upper wall of the dome comprises at least one vent.

6. The assembly of claim 5, wherein the vent is rotatable between an open position and a closed position.

7. The assembly of claim 1, wherein the dome pivots about the tray at the lower when offset to the tray.

8. The assembly of claim 1, wherein the dome is fabricated from heavy duty clear plastic.

9. The assembly of claim 1, wherein the multiple tray ribs comprise three tray ribs.

10. The assembly of claim 1, wherein the dome flange extends about one inch beyond the tray flange when the dome mates with the tray.

11. The assembly of claim 1, wherein the gap between the tray flange and the dome flange enables passage of air into the propagation tray.

12. The assembly of claim 1, wherein the depressions of the dome flange have substantially the same shape as the tray ribs.

13. The assembly of claim 1, further comprising a base portion, the base portion being sized and dimensioned to support the propagation tray.

14. The assembly of claim 13, wherein the base portion comprises a base floor and multiple base sidewalls extending from the base floor.

15. A ventilated plant propagation assembly, the assembly comprising:

a propagation tray adapted to propagate a plant, the propagation tray being defined by a plant floor having multiple plant cavities adapted to receive the plant, the propagation tray further being defined by multiple sidewalls extending from the plant floor and extending to a free edge, the free edge forming a tray flange that extends at an orthogonal from the free edge, the tray flange having multiple tray ribs;

a base portion, the base portion being sized and dimensioned to support the propagation tray, base portion comprises a base floor and multiple base sidewalls extending from the base floor;

a dome adapted to mate with the propagation tray, the dome further being adapted to slide laterally in relation to the propagation tray when mated with the propagation tray, the dome being defined by an upper wall, multiple sidewalls having an upper edge joined with the upper wall, and a lower edge opposing the upper edge, the lower edge terminating at a dome flange having a flat surface, the dome flange extending beyond the tray flange when the dome mates with the tray, the dome flange having multiple depressions;

whereby slidably offsetting the dome from the tray urges the tray ribs into the depression of the dome flange, creating a seal between the tray flange and the dome flange to form a sealed position; and whereby slidably aligning the dome with the tray urges the tray ribs against the flat surface of the dome flange, creating a gap between the tray flange and the dome flange to form a ventilated position.

16. The assembly of claim 15, wherein the offset dome pivots about the tray at the lower edge.

17. The assembly of claim 15, wherein the multiple tray ribs comprise three tray ribs.

18. The assembly of claim 15, wherein the dome flange extends about one inch beyond the tray flange when the dome mates with the tray.

19. The assembly of claim 15, wherein the depressions of the dome flange have substantially the same shape as the tray ribs.

20. A ventilated plant propagation assembly, the assembly consisting of:

a propagation tray adapted to propagate a plant, the propagation tray being defined by a plant floor having multiple plant cavities adapted to receive the plant, the propagation tray further being defined by multiple sidewalls extending from the plant floor and extending to a free edge, the free edge forming a tray flange that extends at an orthogonal from the free edge, the tray flange having at least three tray ribs;

a base portion, the base portion being sized and dimensioned to support the propagation tray, base portion comprises a base floor and multiple base sidewalk extending from the base floor;

a dome adapted to mate with the propagation tray, the dome further being adapted to slide laterally in relation to the propagation tray when mated with the propagation tray, the dome being defined by an upper wall, multiple sidewalk having an upper edge joined with the upper wall, and a lower edge opposing the upper edge, the upper wall comprising at least one vent, the lower edge terminating at a dome flange having a flat surface, the dome flange extending about one inch beyond the tray flange when the dome mates with the tray, the dome flange having multiple depressions;

whereby slidably offsetting the dome from the tray urges the tray ribs into the depression of the dome flange, creating a seal between the tray flange and the dome flange to form a sealed position; and whereby slidably aligning the dome with the tray urges the tray ribs against the flat surface of the dome flange, creating a gap between the tray flange and the dome flange to form a ventilated position.

\* \* \* \* \*